United States Patent
Son, Jr. et al.

[15] 3,687,201
[45] Aug. 29, 1972

[54] OIL RECOVERY PROCESS USING MICELLAR SOLUTIONS OF DESIRED VISCOSITY

[72] Inventors: Marion O. Son, Jr., Littleton, Colo. 80120; William C. Tosch, Parker, Colo. 80134

[73] Assignee: Marathon Oil Company, Findlay, Ohio

[22] Filed: Jan. 4, 1971

[21] Appl. No.: 103,460

Related U.S. Application Data

[63] Continuation-in-part of Ser. No. 659,806, Aug. 10, 1967, abandoned.

[52] U.S. Cl. ............................................. 166/275
[51] Int. Cl. ........................................ E21b 43/22
[58] Field of Search...166/275, 274, 273; 252/8.55 D

[56] References Cited

UNITED STATES PATENTS

| | | |
|---|---|---|
| 3,082,822 | 3/1963 | Holm et al. ............... 166/274 |
| 3,163,214 | 12/1964 | Csaszar ..................... 166/274 |
| 3,254,714 | 6/1966 | Gogarty et al. ............. 166/274 |
| 3,275,075 | 9/1966 | Gogarty et al. ............. 166/274 |
| 3,330,343 | 7/1967 | Tosch et al. ............... 166/273 |
| 3,348,611 | 10/1967 | Reisberg .................... 166/275 |
| 3,361,313 | 8/1967 | Riggs et al. ............ 252/8.55 D |

Primary Examiner—Stephen J. Novosad
Attorney—Joseph C. Herring, Richard C. Willson, Jr. and Jack L. Hummel

[57] ABSTRACT

The viscosity of micellar solutions is varied within a range permitted by the viscosity of the hydrocarbon-external phase by utilizing as a surfactant a low average equivalent weight petroleum sulfonate (e.g. about 350) to obtain a relatively high viscosity micellar solution and increasing the average equivalent weight of the surfactant to about 525 to obtain decreased viscosities. These solutions are especially useful in secondary and tertiary oil recovery processes.

8 Claims, 2 Drawing Figures

OIL RECOVERY PROCESS USING MICELLAR SOLUTIONS OF DESIRED VISCOSITY

CROSS-REFERENCE TO RELATED APPLICATIONS

This application is a continuation-in-part of our copending application, Ser. No. 659,806, filed Aug. 10, 1967, now abandoned.

BACKGROUND OF THE INVENTION

Viscosity control of displacing fluids used in secondary type oil recovery processes is very important for many reasons. For example, high viscosity slugs require high pump pressures, i.e. high energy input to flood the reservoir; slugs of substantially lower viscosity than the driven fluids cause "fingering" and thus inefficient oil recovery. Desirably, the viscosity of the slug should be at a minimum to facilitate the ease of pumping but should also be tailored to the particular fluid mobilities in the formation and the particular drive fluid to prevent the possibility of fingering within the formation.

U.S. Pat. Nos. 3,082,822 to Holm et al. and 3,163,214 to Csaszar teach the use of surfactant solutions in hydrocarbon oils in secondary oil recovery processes. Holm et al. control viscosity by choosing the hydrocarbon used in making up the desired slugs. Csaszar controls viscosity by diluting his anhydrous soluble oil with a suitable non-aqueous solvent.

Gogarty et al. in U.S. Pat. No. 3,254,714 teach adjusting the viscosity of a micellar solution by regulating the amount of water incorporated into the solution. The micellar solution contains petroleum sulfonate.

Gogarty et al. in U.S. Pat. No. 3,275,075 teach regulating the viscosity of a microemulsion by adding water to an anhydrous soluble oil to obtain a predetermined viscosity. Again, petroleum sulfonates are used in the microemulsions.

Riggs et al. in U.S. Pat. No. 3,361,313 teach that viscosity of water can be increased by incorporating an alkali metal alkaryl sulfonate. They indicate in Example I, Table 1, that equal concentrations of sodium petroleum sulfonates having average molecular weights of 461 and 435 impart viscosities of 17.95 and 3.36 cp, respectively at 75° F.

Resiberg, in U.S. Pat. No. 3,348,611 teaches that aqueous petroleum sulfonates are useful in oil recovery and that the viscosity of his aqueous sulfonate solution can be increased by adding high molecular weight polymers, e.g. carboxy-methylated cellulose and polyacrylamide polymers. The petroleum sulfonates used in Resiberg's aqueous solutions include water soluble sulfonates, (i.e. having average molecular weights less than 400), and oil-soluble petroleum sulfonates (average molecular weights above 500).

Tosch et al. in U.S. Pat. No. 3,330,343 teach that the viscosity of a micellar solution can be adjusted by incorporating water-soluble salts. Examples of such salts include sodium chloride, potassium chloride, magnesium chloride, etc.

Applicants have found that by varying the equivalent weight of a petroleum sulfonate (i.e. by addition and not by chemically modifying the sulfonate) within a micellar solution containing petroleum sulfonate, viscosity regulation is obtained. This phenomenon is operative only with a system containing at least the three elements: hydrocarbon, water and sulfonate. It is postulated that such control cannot be effected in non-aqueous systems composed of hydrocarbon and sulfonate or hydrocarbon, sulfonate and alcohol.

SUMMARY OF THE INVENTION

The desired viscosity control is accomplished by preparing a micellar solution of a desired viscosity, within a range of viscosities permitted by the viscosity of the hydrocarbon utilized as the external phase of the micellar solution, by utilizing as a surfactant a low average equivalent weight petroleum sulfonate to obtain a high viscosity micellar solution and increasing the average equivalent weight of the sulfonate to decrease the viscosity as desired. Such is effected by blending or incorporating a higher average equivalent weight petroleum sulfonate to obtain lower viscosities or incorporating lower average equivalent weight sulfonates to obtain higher viscosities, the range of average equivalent weights from the lower to higher being within the range of about 350 to about 525, respectively.

DESCRIPTION OF THE INVENTION

Figure 1:
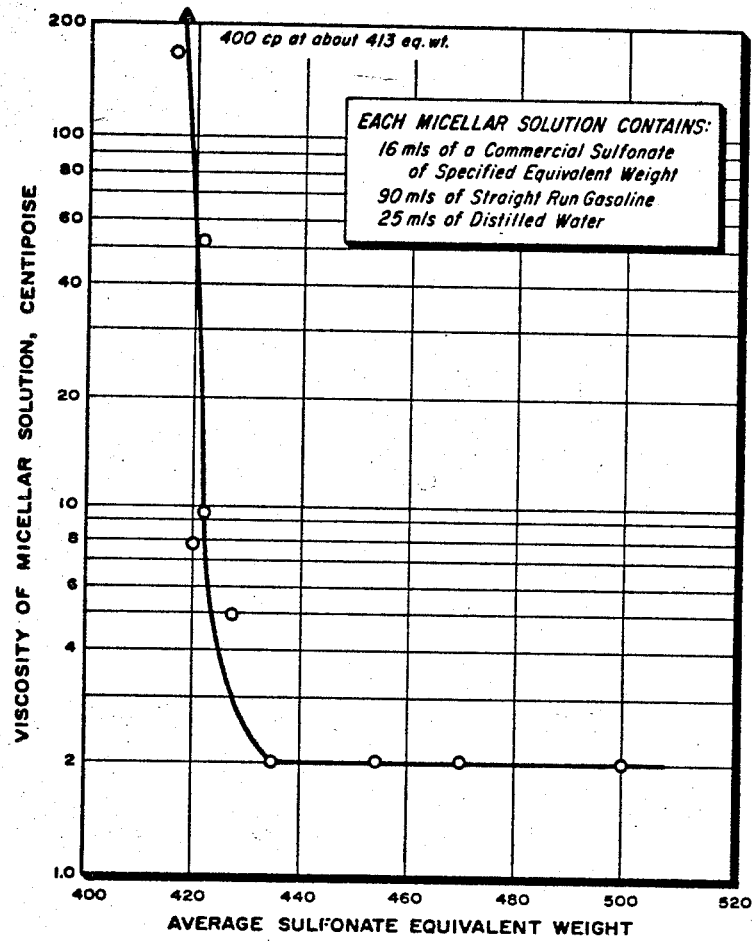
FIG. 1 of the attached drawing illustrates the influence of a particular sulfonate on the viscosity of a micellar solution using a particular hydrocarbon (stabilized light straight-run gasoline).
Figure 2:
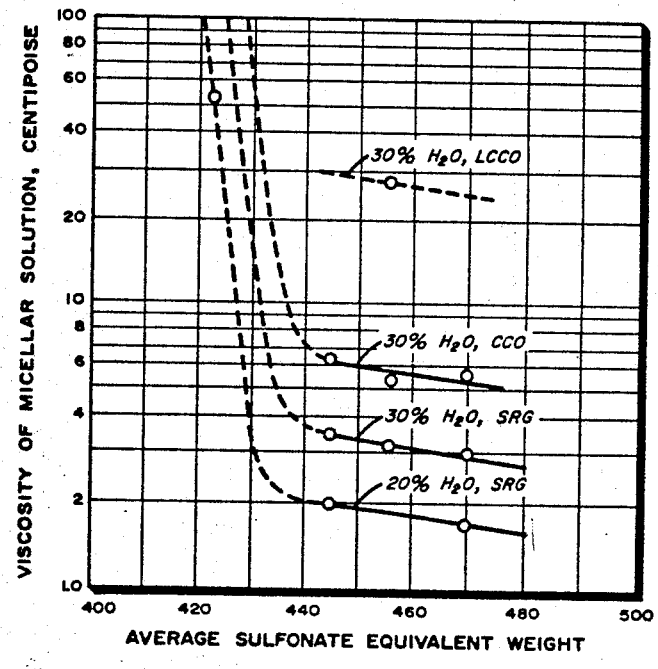
FIG. 2 indicates the effect of sulfonate equivalent weight on the viscosity of micellar solutions composed of particular hydrocarbons and of differing water concentrations. From FIG. 2 it is apparent that sulfonate equivalent weight can control the viscosity of a micellar solution composed of a particular hydrocarbon. The micellar solutions taught within this graph are composed of LCCO (light catalytic cycle oil), CCO (crude column overhead), SRG (stabilized light straight-run gasoline) and 6.6 percent active sulfonate for the 30 percent $H_2O$ solutions and 7.6 percent active sulfonate for the 20 percent $H_2O$ solutions.

The term "micellar solution" as used herein is meant to include "microemulstions" [Schulman and Montagne, Annals of the New York Academy of Sciences, 92, pages 366–371 (1961)], oleopathic hydro-micelles [Hoar and Schulman, Nature, 152, page 102(1943)], "transparent"emulsions (Blair, Jr. et al., U.S. Pat. No. 2,356,205) and slugs defined in U.S. Pat. Nos. 3,254,714 (Gogarty et al.); 3,275,075 (Gogarty et al.); and 3,497,006 (Jones et al.); Micellar solutions are generally transparent in the absence of colored impurities and when not transparent are translucent, and can be generally characterized by their equilibrium tending toward further dispersion of the internal phase rather than toward coalescence of this phase, the latter being characteristic of emulsions.

The petroleum sulfonates useful in this invention are also defined in the prior art as alkyl aryl naphthenic sulfonates. They can be obtained by sulfonating a petroleum distillate (usually high boiling) and then substantially neutralizing with a mono basic compound, such as sodium hydroxide or ammonium hydroxide. Chemically, these sulfonates are monosulfonates or polysulfonates of clustered-ring aromatic naphthenic nuclei having attached thereto a long paraffinic side chain (s). Examples of useful cations of sulfonates includes sodium, ammonium, potassium, and similar type cations.

The average equivalent weight of the sulfonate should be within the range of about 350 up to about 525 and more preferably about 400 up to about 480. If the molecular weight is substantially less than 360, the slug may be characterized as a gel if the hydrocarbon is a straight-run gasoline, as taught within Example III, sample F.

Examples of useful commercially available sulfonates include the sodium alkyl aryl sulfonates marketed by Sonneborn Chemical and Refining Company, 300 Park Avenue South, New York, 10010, New York, composed of about 62 percent active sulfonate, about 33 percent mineral oil, about 4.5 percent water and residue impurities such as inorganic salts. Specific examples are Petronate L (average equivalent weight about 415–430) Petronate K (average equivalent weight about 420–450), Petronate HL (average equivalent weight about 440–470), and Petronate CR (average equivalent weight about 490–510). Pyronate 50 (average equivalent weight about 360, average molecular weight about 490) is also a useful Sonneborn sulfonate; it is composed of 50 percent active sulfonate, 9 percent mineral oil, 39 percent water and 2 percent impurity such as salts. Other examples of commercially available petroleum sulfonates useful with the invention include Bryton sulfonates marketed by Bryton Chemical Company, 630 Fifth Avenue, New York 20, New York, and identified as Bryton F (a sodium sulfonate having an average equivalent weight of about 465), Bryton T (a sodium sulfonate having an average equivalent weight of about 500), Bryton Ammonium Sulfonate 35–35–(an ammonium sulfonate having an average equivalent weight of about 465), etc. Average equivalent weight is defined as the average molecular weight divided by the average number of sulfonate groupings per molecule. Thus, the equivalent weight of a sulfonate is equal to the molecular weight when the sulfonate is a monosulfonate.

Micellar solutions can be tailored to a specific viscosity by choosing the correct average equivalent weight sulfonate to be used in the micellar solution containing a particular hydrocarbon. Such a phenomenon makes it possible to greatly reduce the cost of the micellar solution and to improve the overall cost of recovering crude petroleum or oil in secondary type recovery processes (i.e. secondary as well as tertiary processes. Also, where the specific hydrocarbons are desired in the make-up of micellar solutions, the particular sulfonate used in the micellar solution can be tailored to the particular hydrocarbon to give a micellar slug having a desired viscosity range, i.e. a hydrocarbon with a relatively high viscosity may require a relatively high average equivalent weight sulfonate whereas a relatively low average equivalent sulfonate may be used with a low viscosity hydrocarbon.

Hydrocarbons useful with the micellar solution include crude oil (both sweet and sour), partially refined fractions of crude oil (i.e. distillate cuts), and refined fractions thereof. Side cuts from crude oil columns (e.g. hydrocarbon streams having a boiling point of about 400°–1100° F. at atmospheric pressure) and crude column overheads (e.g. hydrocarbon streams having a boiling point of about 75°–400° F. at atmospheric pressure) are especially useful. Examples of preferred hydrocarbons include light and heavy straight-run gasoline, kerosene, diesel fuel, naphthas, and liquefied petroleum gases. The micellar solution contains an aqueous medium (can be soft water, brackish water or brine) in addition to the sulfonates disclosed herein. If desirable, cosurfactants such as alcohols, esters, amides, ketones, ethers, and like compounds containing 1 to about 20 carbon atoms can be added to the micellar solution to facilitate viscosity regulation; however, it is to be understood that Applicants' micellar solution does not require the use of cosurfactants but also does not exempt the inclusion of same in their solutions.

Preferably, the slugs of this invention contain, by volume, about 30 to about 90 percent hydrocarbon (more preferably about 45 to about 60 percent hydrocarbon), about 5 to about 60 percent or more aqueous medium (more preferably about 15 to about 50 percent water); and at least about 2 percent (based on active sulfonate) and more preferably at least about 4 percent of petroleum sulfonate disclosed herein. If a cosurfactant is incorporated into the micellar solution, it preferably is an alcohol(s) containing 1 to about 16 carbon atoms, e.g. isopropanol, n- and isobutanol, amyl alcohols, 1- or 2-octanols, p- nonyl phenol, etc.

It is preferred to inject into an oil-containing formation a micellar solution slug of about 1 to about 20 percent or more, and more preferably, from about 2 to about 10 percent of the formation pore volume.

Also, it is contemplated that within the micellar solution slug, the viscosity of the slug can be graded from the leading edge of the slug (the edge contacting the oil and water within the formation) to the trailing edge of the slug (the edge contacting the water drive or a water thickened drive, also identified as a mobility buffer) by varying the average equivalent weight of the sulfonate within the micellar solution.

The following examples specifically illustrate working embodiments of this invention. Unless otherwise specified, the percents are measured at volume. The viscosity of the slugs is based on 72° F. and is determined by using a Brookfield Viscometer.

EXAMPLE I

A micellar solution containing 97 ml of straight-run gasoline, 10 gm of an ammonium petroleum sulfonate (100 percent active sulfonate having an average equivalent weight of about 410–430) and 20 percent water, is tested and found to have a viscosity of 410 cp.

EXAMPLE II

A micellar solution is obtained by mixing 95 ml of straight-run gasoline, 8 gms of the ammonium sulfonate of Example I, 8 gms of Petronate "CR" (the average equivalent weight of the combined sulfonates is about 450) and enough water is added to give a 20 percent water concentration. This micellar solution is tested and found to have a viscosity of 1.8 cp.

EXAMPLE III

Examples of micellar solutions exhibiting desirable viscosities which are dependent upon the average equivalent weight of the petroleum sulfonate added to the solution are listed in Table 1.

TABLE 1

| Sample* | Composition of Micellar Solution | Average Equivalent Weight of Petroleum Sulfonate | Viscosity (cp) |
|---|---|---|---|
| Containing One Sulfonate Type | | | |
| A | 10 gms Petronate "CR" 96 mls SRG + M.O. 25 mls dist H$_2$O | 500 | 2 |
| B | 10 gms Bryton "F" 96 mls SRG + M.O. 25 mls dist H$_2$O | 465 | 2 |
| C | 10 gms Petronate "HL" 96 mls SRG + M.O. 25 mls dist H$_2$O | 455 | 2 |
| D | 10 gms Petronate "K" 96 mls SRG + M.O. 25 mls dist H$_2$O | 435 | 2 |
| E | 10 gms Petronate "L" 96 mls SRG + M.O. 25 mls dist. H$_2$O | 423 | 52 |
| F | 10gms Pyronate 50 96 mls SRG + M.O. 25 mls dist H$_2$O | 360 | "gel" |
| Containing Petronate K and Pyronate 50 | | | |
| G | 9 gms Petronate "K" 1 gm Pyronate "50" 96 mls SRG + M.O. 25 mls dist H$_2$O | 428 | 5 |
| H | 8 gms Petronate "K" 2 gms Pyronate "50" 96 mls SRG+M.O. 25 mls dist H$_2$O | 420 | 8 |
| I | 7.5 gms Petronate "K" 2.5 gms Pyronate "50" 96 mls SRG + M.O. 25 mls dist H$_2$O | 416 | 170 |
| J | 7 gms Petronate "K" 3 gms Pyronate 50 96 mls SRG + M.O. 25 mls dist H$_2$O | 413 | 400 |
| Containing Shell Sulfonate and Pyronate "50" | | | |
| K | 8 gms of a sodium sulfonate (avg. eq wt = 465) 2 gms Pyronate "50" 96 mls SRG + M.O. 25 mls dist H$_2$O | 448 | 6 |
| K | 7.5 gms of a sodium sulfonate 2.5 gms Pyronate 50 96 mls SRG + M.O. 25 mls dist H$_2$O | 442 | 88 |

Note re foregoing table: The amount of sulfonate within the micellar solutions is based on active sulfonate. SRG means stabilized light straight-run gasoline and M.O. means mineral oil or vehicle oil obtained as a result of adding the above amount of active sulfonate. The active equivalent weight of a mixture of sulfonates is based on a weight ratio of said sulfonates.

*Shell sulfonate identifies a commercially available sodium petroleum sulfonate marketed by Shell Chemical Company.

EXAMPLE IV

A micellar solution is obtained by mixing 80% Illinois crude (viscosity of about 7 cp at 72° F.) with 20 percent and then sufficient distilled water is added to the mixture to give a 20 percent water concentration. The viscosity of this micellar solution is 225 cp.

EXAMPLE V

A micellar solution slug is obtained by mixing 80 percent Illinois crude and 20 percent Petronate CR (average equivalent weight 500) and sufficient distilled water to bring the water concentration to 20 percent. The viscosity of the micellar solution is 25 cp.

Example V compared with Example IV indicates the significance of "tailoring" the surfactant to the hydrocarbon, i.e. a 455 average equivalent weight sulfonate effects a 225 cp micellar solution whereas a 500 average equivalent weight sulfonate effects a reduced viscosity of 25 cp., both solutions containing a common hydrocarbon.

The above examples are not intended to limit in any way the composition of the micellar solution slugs. It is assumed obvious that additives can be added to the slugs and that the compositions thereof can be varied as taught within the art.

What is claimed is:

1. An improved process of recovering crude oil from a subterranean formation wherein a micellar solution of desired viscosity is injected into the formation and displaced toward a production means to recover crude oil therefrom, the improved process comprising incorporating into the micellar solution comprised of hydrocarbon, aqueous medium, and petroleum sulfonate of predetermined average equivalent weight, a relatively higher average equivalent weight sulfonate to decrease the viscosity of the micellar solution and adding to the micellar solution a relatively lower average equivalent weight petroleum sulfonate to increase the viscosity of the micellar solution.

2. The process of claim 1 wherein the added petroleum sulfonate has an average equivalent weight within the range of about 350 to about 525.

3. The process of claim 2 wherein the average equivalent weight of the added petroleum sulfonate is within the range of about 400 to about 480.

4. The process of claim 1 wherein the micellar solution contains a cosurfactant.

5. The process of claim 1 wherein the micellar solution contains from about 30 to about 90 percent hydrocarbon, about 5 percent to about 60 percent aqueous medium, and at least about 2 percent petroleum sulfonate, the percents based on volume.

6. The process of claim 1 wherein the aqueous medium contains electrolyte.

7. The process of claim 1 wherein the petroleum sulfonate contains a monovalent cation(s).

8. The process of claim 1 wherein the average molecule of the petroleum sulfonate contains one sulfonate group.

* * * * *

UNITED STATES PATENT OFFICE
CERTIFICATE OF CORRECTION

Patent No. 3,687,201        Dated Aug. 29, 1972

Inventor(s) Marion O. Son, Jr. and William C. Tosch

It is certified that error appears in the above-identified patent and that said Letters Patent are hereby corrected as shown below:

| | |
|---|---|
| Col. 1, line 47: | Delete "Resiberg" and insert --Reisberg--. |
| Col. 2, line 47: | Delete "microemulations" and insert --microemulsions--. |
| Col. 2, line 54. | Delete ";" and insert --,--. |
| Col. 3, line 37. | Delete "35-35-" and insert --35-K--. |
| Col. 3, line 21: | "415-413)" should read -- 415-413), --. |
| Col. 4, line 48: | Delete "measured at" and insert --based on--. |
| Col. 4, line 49. | Delete "based on" and insert --measured at--. |
| Col. 5, line 59. | After "per" insert --cent Petronate HL (average equivalent weight 455)--. |
| Col. 6, line 11: | Delete "the" and insert --this--. |

Signed and sealed this 27th day of March 1973.

(SEAL)
Attest:

EDWARD M. FLETCHER, JR.
Attesting Officer

ROBERT GOTTSCHALK
Commissioner of Patents